US 7,809,251 B2

(12) United States Patent
Torii

(10) Patent No.: US 7,809,251 B2
(45) Date of Patent: Oct. 5, 2010

(54) INFORMATION RECORDING/REPRODUCTION APPARATUS

(75) Inventor: Shinnosuke Torii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1066 days.

(21) Appl. No.: 11/276,010

(22) Filed: Feb. 9, 2006

(65) Prior Publication Data

US 2006/0193222 A1 Aug. 31, 2006

(30) Foreign Application Priority Data

Feb. 25, 2005 (JP) .............................. 2005-051158

(51) Int. Cl.
*H04N 5/00* (2006.01)
(52) U.S. Cl. ..................................... 386/125
(58) Field of Classification Search ................. 386/117, 386/124, 125–126, 95; 348/208.13, 208.12
See application file for complete search history.

(56) References Cited

U.S. PATENT DOCUMENTS

| 5,335,042 | A | * | 8/1994 | Imafuji et al. .................. 396/55 |
| 5,745,645 | A | * | 4/1998 | Nakamura et al. ........... 386/131 |
| 6,456,584 | B1 | | 9/2002 | Nagata et al. |
| 6,798,447 | B1 | * | 9/2004 | Katsuki ................. 348/208.12 |
| 6,940,794 | B2 | | 9/2005 | Hayashi |
| 7,397,499 | B2 | * | 7/2008 | Okada et al. ........... 348/208.13 |

FOREIGN PATENT DOCUMENTS

| JP | 5-107619 | 4/1993 |
| JP | 7-147663 | 6/1995 |
| JP | 7-298120 | 11/1995 |
| JP | 8-336070 | 12/1996 |
| JP | 2002-342932 | 11/2002 |
| JP | 2004-54963 A | 2/2004 |
| JP | 2004-158149 | 6/2004 |
| JP | 2004-343483 | 12/2004 |

OTHER PUBLICATIONS

Japanese Office Action dated Jun. 9, 2009, issued in corresponding Japanese patent application No. 2005-051158, with an English translation.
Japanese Office Action dated Nov. 17, 2009, issued in corresponding Japanese patent application No. 2005-051158, with an English translation.

* cited by examiner

*Primary Examiner*—Thai Tran
*Assistant Examiner*—Tat Chio
(74) *Attorney, Agent, or Firm*—Fitzpatrick, Cella, Harper & Scinto

(57) ABSTRACT

A disk camcorder includes an image pickup optical system including an image pickup element, a memory for temporarily storing recorded information from the image pickup element, and a recording/reproduction unit which records the recording information stored in the memory onto a disk-shaped recording medium through an intermittent operation or reproduces the recording information recorded onto the disk-shaped recording medium through an intermittent operation, and temporarily stores the recording information. The disk camcorder has a plurality of modes including a first mode in which the recording medium is irradiated with light flux having a first laser power for a first time period, and a second mode in which the recording medium is irradiated with light flux having a second laser power lower than the first laser power, for a second time period, longer than the first time period.

15 Claims, 2 Drawing Sheets

INFORMATION RECORDING/REPRODUCTION APPARATUS

This application claims priority from Japanese Patent Application No. 2005-051158, filed on Feb. 25, 2005, which is hereby incorporated by reference herein.

BACKGROUND OF THE INVENTION

1. Field of the Invention

The present invention relates to an information recording/reproduction apparatus that records or reproduces image pickup information, or the like, onto or from a disk-shaped recording medium, such as a CD, a DVD, an MD, or a Blu-ray Disc.

2. Related Background Art

In recent years, recording/reproduction apparatuses that are capable of recording/reproducing not only audio signals, but also, video signals, whose information amounts are larger than those of the audio signals, have come into widespread use, as a result of an increase in recording densities of disk-shaped recording media. For instance, video camera apparatuses containing disk-type recording media (hereafter referred to as "disk camcorders"), such as camcorders using DVDs, have been developed and mass produced. Means for preventing degradation of recorded information due to vibration of a recording/reproduction apparatus using a disk-shaped recording medium in such a disk camcorder is proposed in Japanese Patent Application Laid-Open No. 2004-158149, for instance. This patent document will be described below.

In general, in a recording/reproduction apparatus that records/reproduces information by irradiating laser light from an objective lens onto a disk-shaped recording medium, such as an optical disk, the information is recorded/reproduced through an intermittent operation, such as an operation shown in FIG. 4. That is, as distinct from the case of a tape medium onto/from which information is sequentially recorded/reproduced, in the case of a disk medium, there are a period "a", in which information is actually recorded/reproduced onto/from the disk medium, and a period "b" in which no information is recorded/reproduced thereonto/therefrom.

When an image pickup time of image pickup information having the same data amount is referred to as "t(a+b)" and the data is recorded, for instance, a period required to record the data becomes "t" in the case of a tape medium, but becomes around one-third of "t" in the case of a disk medium, such as a DVD, under present circumstances. Note that, in FIG. 4, for ease of explanation, only an intermittent operation at the time of recording is shown, but the same intermittent operation is also performed at the time of reproduction.

In the case of the conventional example described above, there are the following problems. That is, in general, an objective lens that irradiates laser light onto an optical disk is mounted on an objective lens actuator. Also, the objective lens is constructed so that it is biaxially drivable to follow axial runout of a disk surface (deflections that occur in a direction vertical to the disk surface) and radial runout (deflections that occur in a direction parallel to the disk surface), and the actuator is driven.

The objective lens actuator is constructed by holding a movable portion to which the objective lens is fixed by four wires, and using a magnetic circuit formed by a coil disposed for the movable portion and a magnet disposed for a fixation portion. The objective lens actuator adopting the four-wire system is widely used, so the description of a concrete structure thereof will be omitted.

An operation to follow the axial runout described above and an operation to follow the radial runout described above are respectively referred to as the "focus (hereafter abbreviated as "Fo")" and the "tracking (hereafter abbreviated as "Tr")", and information is recorded/reproduced by forming a spot on a recording surface of a disk and causing the spot to follow tracks arranged on the recording surface.

When a disturbance, such as vibration or shock, arises, however, a problem occurs that track following is lost, and a recording/reproduction operation becomes impossible. In order to solve this problem, image pickup information is accumulated in a semiconductor memory, and the recording/reproduction operation is performed again for the period "b" shown in FIG. 4, in which no information is recorded/reproduced. When the vibration, or the like, continues for a long period of time, exceeding the capacity of the semiconductor memory, the track following becomes impossible, and, thereby, the recording becomes impossible, or it becomes impossible to record information with the required precision. Alternatively, there occurs a problem (hereafter, referred to as "degradation of recorded information") of writing information onto an unintended track adjacent to a track to be written and, thereby, accidentally overwriting data on the adjacent track.

In the aforementioned conventional technology, degradation of image pickup information due to vibration, such as camera shake, is described. However, the recorded information degradation problem, which occurs at the time of recording onto a disk medium due to the above-described situation, in which the track following becomes impossible (hereinafter, referred to as "servo instability"), is not described. That is, in an extreme example, there is a possibility that there will occur a problem in that even when image pickup information has been shaken due to vibration, such as camera shake, and "no image has been recorded" as a result of the servo instability described above, an operation recognizes that "an image has been picked up".

Also, recent camcorders are each provided with an automatic focus adjustment function. With this function, when it is difficult to obtain an in-focus state with respect to a subject, for instance, a focus adjustment operation is repeated many times, and vibration occurs for a long time, which results in an occurrence of the servo instability.

Further, also when an operator uses zoom means repeatedly, there is a possibility that the same vibration will occur. Still further, as is also apparent from FIGS. 4 and 6 of Japanese Patent Application Laid-Open No. 2004-158149, in a recording/reproduction apparatus that uses a disk-shaped recording medium and performs recording/reproduction through an intermittent operation, even after image pickup by an operator has ended, recording of information is continued for awhile. Therefore, when the operator determines that the image pickup has ended and places the recording/reproduction apparatus on a desk, or the like, roughly, before the information recording is completed, large vibration, or the like, is given to the apparatus and the servo becomes unstable, which results in a possibility that an inconvenient situation, in which recorded information is lost or degraded, or the like, will occur.

It is considered that the problem particularly tends to occur to users accustomed to video camcorders that use tape media, that perform sequential recording during image pickup, and that stop the recording concurrently with the end of the image pickup. In the patent document described above, no countermeasure against this problem is discussed.

In addition, mobile devices, such as disk camcorders, are battery-driven, so there is also a demand for a reduction in power consumption. In the conventional technology described above, there is no specific description as to the power consumption. Also, as will be described in detail later, the case of an intermittent operation, in which information is recorded/reproduced through rotation at a high number of revolutions, makes it possible to reduce power consumption greatly, as compared with the case of rotation at a low number of revolutions.

When information is recorded/reproduced through the rotation at the high number of revolutions, the operation to follow the disk surface axial runout, and the operation to follow the radial runout, need to be performed at a high acceleration, as compared with the case of the low number of revolutions. Consequently, there is a problem in that, in the case of the high number of revolutions, a wide servo bandwidth is required, as compared with the case of the low number of revolutions and, therefore, the servo instability tends to occur, as compared with the case of a low speed.

SUMMARY OF THE INVENTION

An object of the present invention is to provide an information recording/reproduction apparatus that is capable of realizing a reduction in power consumption, without impairing the quality of recorded information. To solve the above-mentioned problems, an information recording/reproduction apparatus includes an image pickup optical system including an image pickup information input circuit including an image pickup element, a memory for temporarily storing information from the image pickup information input circuit, a recording/reproduction circuit for recording information stored in the memory onto a disk-shaped recording medium or reproducing the information from the recording medium through an intermittent operation, and a switching circuit for switching a proportion of an execution time of the recording or reproduction in a cycle of recording or reproducing the same data amount cycle in the intermittent operation.

With the construction described above, it becomes possible to reduce an influence of factors (whose details will be described later) of servo instability, such as axial runout at the time of mounting of a disk medium, radial runout of a disk shape, shape changing, or disk fluctuation, due to disturbance.

DESCRIPTION OF THE PREFERRED EMBODIMENTS

Figure 1:
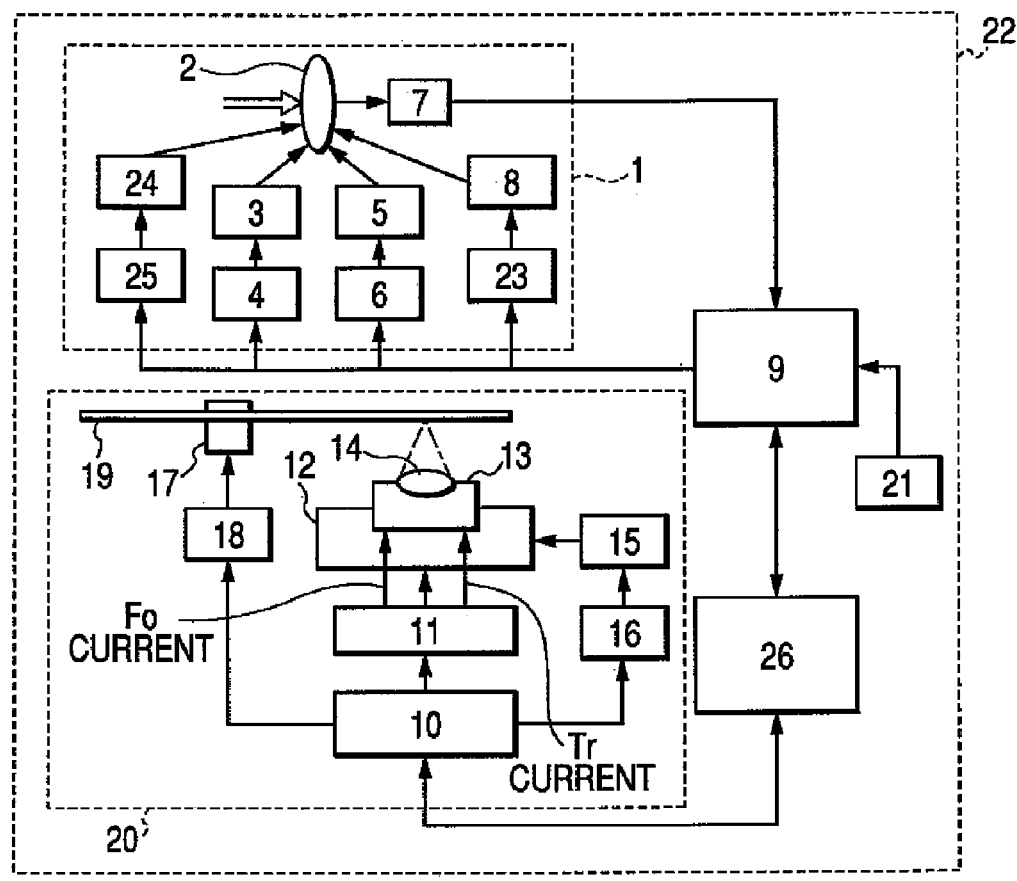
FIG. 1 is a block diagram showing an embodiment of the information recording/reproduction apparatus according to the present invention.

Hereafter, a best mode for carrying out the present invention will be described in detail with reference to the accompanying drawings. FIG. 1 is a block diagram showing an embodiment of the information recording/reproduction apparatus according to the present invention. In FIG. 1, reference numeral 22 denotes an information recording/reproduction apparatus, reference numeral 1, an image pickup optical system, reference numeral 20, a disk recording/reproduction means for recording/reproducing information onto/from a disk-shaped recording medium 19, and reference numeral 9, a recording/reproduction apparatus controller that centrally controls the entirety of the information recording/reproduction apparatus 22, and performs information processing, and the like.

Reference numeral 26 indicates switching means for switching an "R/W time rate" to be described later. Note that the recording/reproduction apparatus controller 9 is composed of a CPU, a memory, and the like, and also, includes a semiconductor memory, in which information is temporarily stored in order to perform the intermittent operation described in the "Related Background Art" section of this specification.

The image pickup optical system 1 includes an image pickup optical unit 2 having a focusing function, a camera shake compensation function, an aperture adjustment function, and a zoom function, a CCD 7 that converts image pickup information inputted by the image pickup optical unit 2 into electrical signals, a focusing actuator 3 that drives a lens in order to obtain an in-focus state with respect to a subject, a driver 4 that drives the focusing actuator 3, an aperture adjustment actuator 24 that performs aperture adjustment, a driver 25 that drives the aperture adjustment actuator 24, a zoom actuator 5 that drives the lens in order to enlarge/reduce an image of the subject, a driver 6 that drives the zoom actuator 5, a camera shake compensation actuator 8 that compensates for camera shake by driving a camera shake compensation lens (included in the image pickup optical unit 2) based on the shake of the image pickup information inputted into the CCD 7, and a driver 23 that drives the camera shake compensation actuator 8.

The disk recording/reproduction means 20 includes the disk 19, such as an optical disk, onto/from which information is recorded/reproduced, a spindle motor 17 on which the disk 19 is mounted, and which rotates the disk 19, a spindle motor driver 18, an objective lens 14 that forms a light spot by irradiating a beam from a semiconductor laser (not shown) onto a recording surface of the disk 19, an objective lens actuator 13 that is described in the "Related Background Art" section of this specification and drives the objective lens 14, an optical pickup 12 on which the objective lens 14, the semiconductor laser, an optical element, a sensor, and the like, are mounted, an optical pickup driver 11 that controls the objective lens actuator 13, a laser light amount, and the like, a seek motor 15 that moves the optical pickup 12 in a radial direction of the disk 19, a seek motor driver 16 that controls the seek motor 15, and a controller 10 composed of a CPU, a memory, and the like, and serves as a nerve center in each sequence control. Also, the controller 10 centrally controls each driver, servo/RF processing, in which processing of output signals from sensors provided for the optical pickup 12, and the like, are performed, and the disk recording/reproduction means 20. Reference numeral 21 represents a vibration sensor that detects vibration of a gyro, or the like.

Next, a recording operation will be described in detail. When a power source (not shown) is turned on, and an image pickup mode is set by an operator, image pickup information, which is input information, is imaged on the CCD 7 through the image pickup optical unit 2 and is photoelectrically converted into electrical signals. The recording/reproduction apparatus controller 9 creates an in-focus signal for judgment of an in-focus state from a high-frequency component of the inputted image pickup information. Then, feedback to the focusing actuator 3, which is a stepping motor, is performed through the driver 4 in response to the in-focus signal, and an in-focus state is obtained by driving the lens (included in the image pickup optical unit 2) in an optical axis direction of the image pickup optical system.

As the focusing means described above, it is possible to use means described in Japanese Patent Application Laid-Open No. H07-298120, for instance. Also, in the present invention, a case of automatic focusing is described as an example, but a construction is also possible in which a focusing switch, or the like, is provided for a main body of the recording/reproduction apparatus, and a focusing operation is carried out in response to a command from the operator.

Also, in this embodiment, camera shake compensation means described in Japanese Patent Application Laid-Open No. H05-107619, or the like, is used. In brief, shake information is created at the recording/reproduction apparatus controller 9 from the image pickup information obtained from the CCD 7, and drives the camera shake compensation lens included in the image pickup optical unit 2 by driving the camera shake compensation actuator 8 through the driver 23, based on the shake information.

Further, in this embodiment, aperture adjustment means described in Japanese Patent Application Laid-Open No. H08-336070 is used. In brief, a video luminance signal is created at the recording/reproduction apparatus controller 9 from the image pickup information obtained from the CCD 7, and adjusts an aperture included in the image pickup optical unit 2 by driving the aperture adjustment actuator 24 through the driver 25, based on the video luminance signal.

Also, a case wherein the operator turns on a zoom switch (not shown) (which generally has two positions that are a tele-side position and a wide-side position, in addition to an off position) will be described. In this case, zooming is carried out through input of input information of the zoom switch into the recording/reproduction apparatus controller 9, driving the zoom actuator 5, which is a stepping motor, by the driver 6, and driving of the lens (included in the image pickup optical unit 2).

The image pickup information obtained in the manner described above is temporarily accumulated in the semiconductor memory included in the recording/reproduction apparatus controller 9 in order to perform intermittent recording, as in the case of the aforementioned prior art. Then, after a predetermined amount of data is accumulated in the semiconductor memory, the image pickup information is recorded onto the disk 19 by the disk recording/reproduction means 20.

Next, an operation of the disk recording/reproduction means 20 will be described in detail. The optical pickup driver 11 is controlled by the controller 10 of the disk recording/reproduction means 20 controlled based on a command from the recording/reproduction apparatus controller 9. In addition, the seek motor driver 16 and the spindle motor driver 18 are centrally controlled, and the spindle motor 17 is driven by the spindle motor driver 18, to rotate a desired number of revolutions. As a result, the disk 19, mounted on the spindle motor 17, also rotates integrally. Also, the seek motor 15, which is a stepping motor, is driven by the seek motor driver 16, and the optical pickup 12 is moved to an arbitrary position in the radial direction of the disk 19.

Also, the laser light from the semiconductor laser of the optical pickup 12 is controlled by the optical pickup driver 11, and is irradiated onto the recording surface of the disk 19 through the objective lens 14, and recording of information is carried out. When doing so, as described above, the objective lens 14 is caused to follow tracks arranged on the recording surface of the disk 19. Therefore, drive currents (which are an Fo current in an Fo direction and a Tr current in a Tr direction), to the objective lens actuator 13, are controlled by the optical pickup driver 11, based on an Fo error signal and a Tr error signal, to be described later.

The Fo error signal is a signal obtained in accordance with a relative distance in a vertical direction between the objective lens 14 and the disk 19, is a signal that becomes "0" under an in-focus state, and is obtainable with an astigmatism method, or the like. On the other hand, the Tr error signal is a signal obtained in accordance with a relative distance in a direction parallel between the tracks formed on the recording surface of the disk 19, and the disk surface of the spot, is a signal that becomes "0" when the spot is positioned at approximately the centers of the tracks, and is obtainable with a push-pull method, or the like.

It should be noted here that the method for generating the Fo error signal, the method for generating the Tr error signal, and the like, are well known, and, therefore, a description thereof will be omitted. Also, the present invention is not limited to the astigmatism method and the push-pull method described above, and it is, of course, possible to use other techniques.

A reproduction operation is opposite to the recording operation described above, and recorded information having a predetermined data amount is reproduced from the disk 19, and is accumulated in the semiconductor memory of the recording/reproduction apparatus controller 9 under centralized control by the recording/reproduction apparatus controller 9. Following this, the recorded image pickup information is transferred to a display portion, such as an LCD (not shown), an external monitor through an external output connector, or the like.

Figure 4:
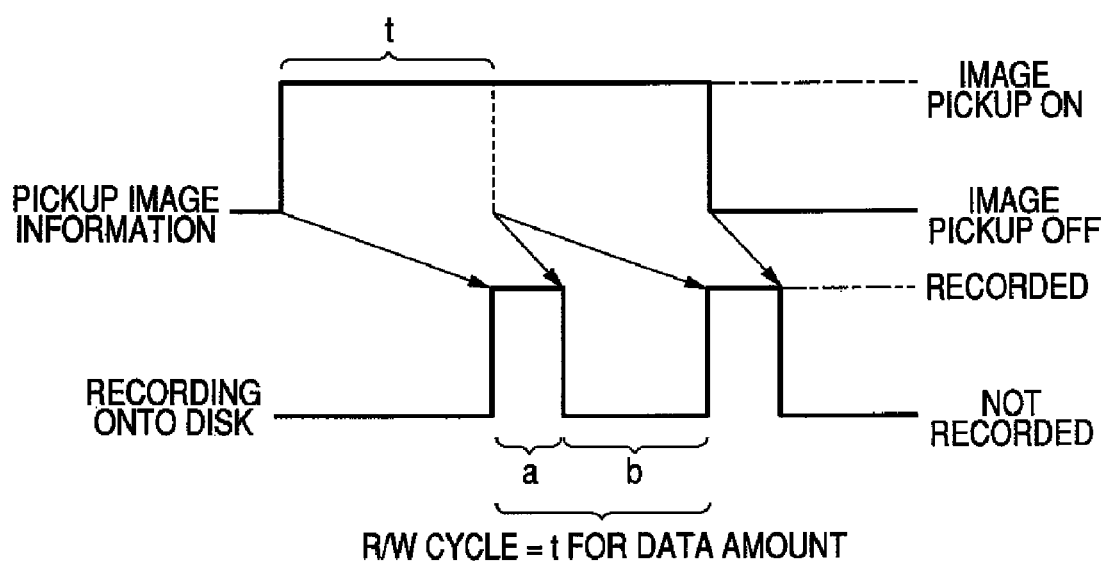
FIG. 4 is a schematic diagram showing an intermittent operation.

Next, an intermittent operation will be described in detail. As shown in FIG. 4, relating to the conventional technique, the intermittent operation includes a period "a", in which information is actually recorded/reproduced onto/from a disk medium, and a period "b" in which no information is recorded/reproduced. In the present invention, cycles (=periods "t"="a+b"), in which the same amount of data is recorded/reproduced, are referred to as "R/W cycles for the same data amount". Also, a proportion (=a/t) of a period, in which data is actually recorded/reproduced, in each R/W cycle for the same data amount, is referred to as the "R/W time rate". Therefore, the image pickup information is first accumulated in the semiconductor memory, and is then written onto the disk medium intermittently.

Also, when production is performed, an operation that is opposite to an operation at the time of recording is performed. Further, when data is transferred to a personal computer, or the like, at an n-fold speed, information is recorded/reproduced by setting the R/W cycles for the same data amount at "t/n" and setting periods, in which information is actually recorded/reproduced onto/from the disk medium, at "a/n" through multiplication of the number of revolutions of the disk by "n".

Table 1 shows parameters of the intermittent operation and roughly estimated average power consumptions. Note that, in Table 1, only characteristic portions of the present invention are excerpted and are shown, and power consumptions by other recording/reproduction apparatuses are omitted.

TABLE 1

|  |  |  | First R/W mode | | Second R/W mode | |
| --- | --- | --- | --- | --- | --- | --- |
|  |  |  | Power consumption mW | Period sec | Power consumption mW | Period sec |
| Period a | SPM activation | Activation | 300 | 0.2 | 600 | 0.2 |
|  | Under recording |  | 1110 | 7 | 1440 | 3.5 |
|  | Sensor | Stationary energization | 200 |  | 200 |  |
|  | SPM | Stationary rotation | 10 |  | 40 |  |
|  | LD | Recording power | 900 |  | 1200 |  |
| Period b |  | Drive off | 0 | 15 | 0 | 18.5 |
| R/W cycle for data amount |  |  |  | 22.2 |  | 22.2 |
| Average power consumption |  |  | 352.7 |  | 232.4 |  |

In this embodiment, the R/W cycles for the same data amount (=periods "t") are fixed at 22.2 seconds. Also, two R/W modes that are a first R/W mode, whose first R/W time rate "r1" is "0.32 (=7.2/22/2)", and a second RAY mode, whose second R/W time rate "r2" is "0.17 (=3.7/22.2)" and in which a recording time to be described later is halved, are prepared. Note that a value of the first R/W time rate is approximately the same as a value actually used in a conventional optical disk apparatus, or the like.

Also, the period "a", in which information is actually recorded/reproduced, is composed of an activation time of the spindle motor 17 (denoted as "SPM" in Table 1) and a recording time. Here, the activation time of the spindle motor 17 refers to a time required for activating the spindle motor 17 under a stoppage state to reach an intended number of revolutions, with a target value being set at 2000 rpm in the first R/W mode and 4000 rpm in the second R/W mode. Note that the power consumption at the time of the SPM activation and the period of the SPM activation are values obtained from experimental results.

Also, in this embodiment, the recording time refers to a period in which image pickup information is recorded/reproduced after the spindle motor 17 reaches a stationary rotation. In Table 1, power consumptions of three kinds of items (that is, a front monitor sensor and an RF/servo sensor are referred to as "sensor"; "SPM"; and the semiconductor laser is referred to as "LD"), which are predominant in determining the power consumption at the time of the recording, are shown as a breakdown.

It should be noted here that the values are values containing the power consumptions at respective drivers, and the like. The power consumptions by the SPM at the time of stationary rotations at 2000 rpm and 4000 rpm, the power consumption by the sensor, and the power consumption by the LD in the first R/W mode are actually measured values, and the power consumption by the LD in the second R/W mode is an analytical value based on the power consumption in the first R/W mode described above.

In the period "b", every drive is turned off, so the power consumption becomes "0". The average power consumptions in the R/W cycles for the same data amount are calculated from the results obtained above through calculation of "(total sum of "power consumption×period" in each item)/(R/W cycle for the same data amount)".

It can be understood from the above that the power consumption in the second R/W mode having a number of revolutions being twice as many as a low number of revolutions of the first R/W mode is reduced from the power consumption in the first R/W mode by about 120.3 mW. Note that even when the SPM activation in the period "a" is eliminated by rotating the spindle motor 17, also, in the period "b", a difference between both power consumptions becomes 121.4 mW, and it is possible to provide the effects of the present invention in a similar manner.

Accordingly, the use of the second R/W mode, in which rotation at a high number of revolutions is performed, is effective at achieving a reduction in power consumption. Therefore, ordinarily, the second R/W mode is set.

Figure 2:
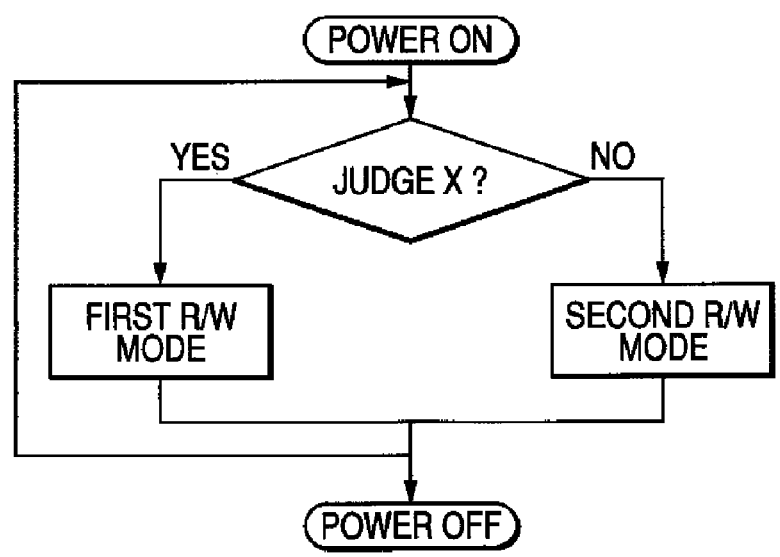
FIG. 2 is a flowchart showing an operation of switching means according to the present invention.

As described in detail in the "Related Background Art" section of this specification, however, there is a problem in that the servo tends to become unstable in the second R/W mode. Hereafter, a method for avoiding instability of the servo will be described in detail, with reference to FIG. 2. FIG. 2 shows an operation of the switching means 26, and a judgment "X" for switching between the first R/W mode and the second R/W mode is a judgment as to whether the following items (1) to (6) are detected.

(1) Driving of Focusing Actuator 3

When the focusing actuator 3 is driven, vibration occurs, resulting from, for example, sliding of a drive source itself or the image pickup optical unit 2. Consequently, when driving of the focusing actuator 3 is detected through detection of a command to the driver 4 or a drive current to the focusing actuator 3 (the judgment "X" of FIG. 2 is "Yes"), the instability of the servo is avoided by performing switching to the first R/W mode.

(2) Driving of Camera Shake Compensation Actuator 8

When the camera shake compensation actuator 8 is driven, vibration occurs, resulting from, for example, sliding of a drive source itself or the image pickup optical unit 2. Consequently, when driving of the camera shake compensation actuator 8 is detected through detection of a command to the driver 23 or a drive current to the camera shake compensation actuator 8 (the judgment "X" of FIG. 2 is "Yes"), instability of the servo is avoided by performing switching to the first R/W mode.

(3) Driving of Aperture Adjustment Actuator 24

When the aperture adjustment actuator 24 is driven, vibration occurs, resulting from, for example, sliding of a drive source itself or the image pickup optical unit 2. Consequently, when driving of the aperture adjustment actuator 24 is detected through detection of a command to the driver 25 or a drive current to the aperture adjustment actuator 24 (the judgment "X" of FIG. 2 is "Yes"), instability of the servo is avoided by performing switching to the first R/W mode.

(4) Driving of Zoom Actuator 5

When the zoom actuator 5 is driven, vibration occurs, resulting from, for example, sliding of a drive source itself or the image pickup optical unit 2. Consequently, when driving of the zoom actuator 5 is detected through detection of a command to the driver 6 or a drive current to the zoom actuator 5 (the judgment "X" of FIG. 2 is "Yes"), instability of the servo is avoided by performing switching to the first R/W mode.

(5) Vibration/Shock Given to Recording/Reproduction Apparatus Main Body as Disturbance When shock or vibration is given to the main body of the recording/reproduction apparatus, the servo becomes unstable. Therefore, when vibration or shock equal to or greater than an arbitrary threshold value is detected by the vibration sensor 21 (the judgment X of FIG. 2 is "Yes"), instability of the servo is avoided, by performing the switching to the first R/W mode.

Figure 3:
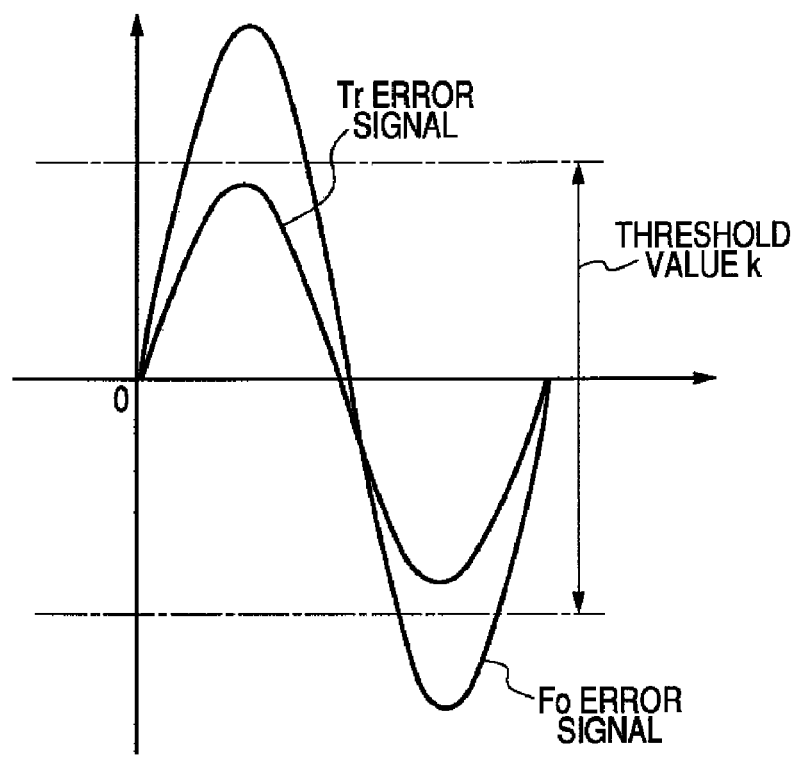
FIG. 3 is a schematic diagram for explanation of a focus error signal and a tracking error signal.

(6) Amplitude of Fo Error Signal and Tr Error Signal of Disk 19 Equal to or Greater than Arbitrary Threshold Value FIG. 3 is a schematic diagram of a general Fo error signal and a Tr error signal. As shown in FIG. 3, each signal is an approximately sinusoidal signal. Also, as described above, the Fo error signal becomes "0" (=target value) under an in-focus state with respect to the recording surface of the disk 19 and the Tr error signal becomes "0" (=target value) in the center portion of the track, with amplitudes of the signals being increased as distances from respective target positions are increased.

Therefore, for example, when the disk 19 is warped, is tilted, or is significantly eccentric with respect to the spindle motor 17, the amplitudes of respective signals are increased. In addition, also, when the disk 19 is greatly displaced due to shock, vibration, or the like, given to the recording/reproduction apparatus main body, the amplitudes of these signals are increased, and the servo becomes unstable. Therefore, an arbitrary threshold value (threshold value "k" of FIG. 3) is determined, and the threshold value "k" is exceeded (the judgment X of FIG. 2 is "Yes"), instability of the servo is avoided by performing the switching to the first R/W mode.

An Fo drive current and a Tr drive current are respectively applied in accordance with the Fo error signal and the Tr error signal, so that it is also possible to make the same judgment as based on the maximum values and the minimum values of the drive currents. In particular, when the judgment is made based on a drive amount of the objective lens 14 indicated by the drive currents or the error signals, it also becomes possible to avoid instability of the servo ascribable to a disk shape and shape changing, for example, in the case of increasing tilt due to a temperature rise. In this embodiment, both of the Fo error signal (Fo drive current) and the Tr error signal (Tr drive current) are used, but it is possible to provide the effects of the present invention, even with only one of the signals.

Also, in FIG. 3, the same threshold value k is set for both signals, but it is also possible to set different threshold values for the respective signals. In addition, as described above, the Fo error signal (Fo drive current) is in a direction vertical to the disk surface, and the Tr error signal (Tr drive current) is in a direction parallel to the disk surface. Therefore, the amplitude of the Fo error signal (Fo drive current) is referred to as "L", the amplitude of the Tr error signal (Tr drive current) is referred to as "M", calculation of "$\sqrt{L^2+M^2}$" is carried out, and the judgment can be made by comparing the calculated value with the threshold value.

It should be noted here that the judgment may be made using only one of the judgment items (1) to (6) described above, or may be made using a combination of the judgment items (1) to (6).

Also, the present invention is not limited to the construction described above. For instance, a construction in which a stepping motor is used as the drive source has been described as an example, but, as a matter of course, it is also possible to use a DC motor. Also, a construction in which the objective lens actuator 13 adopts the four-wire system has been described as an example, but it is also possible to use an objective lens actuator adopted as an axis sliding system.

Further, in this embodiment, two kinds of R/W modes have been described, but a construction is also possible in which, for instance, three kinds of R/W modes are set, and switched in accordance with each of the judgment items described above. That is, it is possible to provide the effects of the present invention even by setting an R/W mode, in which information is recorded/reproduced through rotation at the maximum speed, when the servo is most stabilized, setting an R/W mode, in which information is recorded/reproduced through rotation at a middle number of revolutions, when an influence of vibration due to (2) camera shake compensation or (3) aperture adjustment is slight, and setting an R/W mode, in which information is recorded/reproduced through rotation at a low speed, as with the other case.

Also, as a matter of course, instead of a construction in which the modes are switched for each of the items (1) to (6) in the manner described above, it is possible to use a construction in which, for instance, only item (6) is used, and the switching is performed, so that an R/W mode, in which information is recorded/reproduced through rotation at the maximum speed is in an ordinary case, an R/W mode in which information is recorded/reproduced through rotation at the middle number of revolutions is set when a threshold value "k1" is exceeded, and an R/W mode in which information is recorded/reproduced through rotation at the low speed is set when a threshold value "k2" corresponding to a large displacement as compared with the threshold value "k1" is exceeded.

As described above, according to the present invention, it becomes possible to achieve a reduction in power consumption without impairing the quality of recorded information. Also, it becomes possible to reduce an influence of vibration generated from drive means that is driven based on image pickup information obtained from an image pickup element, such as a CCD, for the sake of focus adjustment, camera shake compensation, a zoom operation, an aperture adjustment, or the like.

Further, it becomes possible to reduce an influence of vibration due to a disturbance, such as camera shake, sudden panning, or collision. Still further, it becomes possible to reduce an influence of a factor of servo instability, such as axial runout at the time of mounting of a disk medium, radial runout of a disk shape, shape changing, or disk fluctuation due to disturbance.

What is claimed is:

1. A disk camcorder comprising:
   an image pickup optical system including an image pickup element for obtaining recording information to be recorded;
   a memory for receiving the recording information obtained by the image pickup element and for temporarily storing the recording information;
   a recording/reproduction unit, coupled to the memory, for irradiating a disk-shaped recording medium (i) to record the recording information temporarily stored in the memory onto a disk-shaped recording medium through an intermittent operation having a first intermittent operation mode and a second intermittent operation mode or (ii) to reproduce the recording information recorded on the disk-shaped recording medium through the intermittent operation and to temporarily store the recording information in the memory; and
   a switching unit for switching between the first intermittent operation mode and the second intermittent operation mode, wherein, in the first mode, the disk-shaped recording medium is irradiated with light flux having a first laser power for a first time period, and in the second mode, the disk-shaped recording medium is irradiated with light flux having a second laser power, which is lower in power than the first laser power, for a second time period, which is longer than the first time period.

2. A disk camcorder according to claim 1, wherein the image pickup element obtains pickup image information, and the switching unit receives pickup image information obtained by the image pickup element and performs switching based on the received pickup image information.

3. A disk camcorder according to claim 2, wherein the image pickup optical system comprises a focus adjustment unit, the pickup image information includes a focus signal, and the switching unit performs switching based on the focus signal obtained from the pickup image information.

4. A disk camcorder according to claim 2, wherein the image pickup optical system comprises a camera shake compensation unit, the pickup image information includes shake information, and the switching unit performs switching based on the shake information obtained from the pickup image information.

5. A disk camcorder according to claim 2, wherein the image pickup optical system comprises an aperture adjustment unit, the pickup image information includes a video luminance signal, and the switching unit performs switching based on the video luminance signal obtained from the pickup image information.

6. A disk camcorder according to claim 1, wherein the image pickup optical system comprises a drive unit for generating a drive signal, and the switching unit performs switching based on the drive signal generated in the drive unit.

7. A disk camcorder according to claim 6, wherein the drive unit is a focus adjustment unit for generating the drive signal, and the switching unit performs switching based on the drive signal of the focus adjustment unit.

8. A disk camcorder according to claim 6, wherein the drive unit is a camera shake compensation unit for generating the drive signal, and the switching unit performs switching based on the drive signal of the camera shake compensation unit.

9. A disk camcorder according to claim 6, wherein the drive unit is a zoom unit for generating the drive signal, and the switching unit performs switching based on the drive signal of the zoom unit.

10. A disk camcorder according to claim 6, wherein the drive unit is an aperture adjustment unit for generating the drive signal, and the switching unit performs switching based on the drive signal of the aperture adjustment unit.

11. A disk camcorder according to claim 1, further comprising a vibration detection unit which sends an input signal to the switching unit, wherein the switching unit performs switching based on the input signal from the vibration detection unit.

12. A disk camcorder according to claim 1, wherein the recording/reproduction unit includes an objective lens for irradiating the disk-shaped recording medium with laser light and an objective lens actuator for driving an objective lens by a drive amount, and wherein the switching circuit performs switching based on the drive amount of the objective lens actuator.

13. A disk camcorder according to claim 1, wherein the intermittent operation is a constant cycle including (i) a period of time in which information is being recorded onto or reproduced from the recording medium and (ii) a period of time in which no information is recorded onto or reproduced from the recording medium, such that an amount of information being recorded onto or reproduced from the recording medium is the same for each cycle of the intermittent operation.

14. A disk camcorder according to claim 1, wherein, in the first intermittent operation mode, a reduction in power consumption takes preference.

15. A disk camcorder according to claim 1, wherein, in the second intermittent operation mode, stabilization of tracking/focusing servo of light flux for performing recording or reproducing takes preference.

* * * * *